United States Patent
Choudhary et al.

(10) Patent No.: US 8,782,630 B2
(45) Date of Patent: Jul. 15, 2014

(54) SMART REBINDING FOR LIVE PRODUCT INSTALL

(75) Inventors: Samar Choudhary, Morrisville, NC (US); Hao Q. La, Raleigh, NC (US); Jean-Marc Paulin, Morden (GB); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/174,693

(22) Filed: Jun. 30, 2011

(65) Prior Publication Data

US 2013/0007723 A1    Jan. 3, 2013

(51) Int. Cl.
*G06F 9/44* (2006.01)
*G06F 9/445* (2006.01)
*G06F 17/00* (2006.01)
*G06F 17/30* (2006.01)

(52) U.S. Cl.
USPC ........... 717/170; 717/168; 717/169; 717/173; 717/174; 707/633; 707/803

(58) Field of Classification Search
None
See application file for complete search history.

(56) References Cited

U.S. PATENT DOCUMENTS

| | | | |
|---|---|---|---|
| 6,185,734 B1 * | 2/2001 | Saboff et al. | 717/164 |
| 6,199,203 B1 * | 3/2001 | Saboff | 717/168 |
| 6,301,710 B1 * | 10/2001 | Fujiwara | 717/175 |
| 6,377,960 B1 * | 4/2002 | Qiu et al. | 1/1 |
| 6,698,018 B1 | 2/2004 | Zimniewicz et al. | |
| 6,990,660 B2 * | 1/2006 | Moshir et al. | 717/171 |
| 7,188,163 B2 | 3/2007 | Srinivasan et al. | |
| 7,966,612 B2 * | 6/2011 | D'Alterio et al. | 717/168 |
| 8,332,356 B2 * | 12/2012 | Thergaonkar et al. | 707/633 |
| 8,375,381 B1 * | 2/2013 | Clark et al. | 717/170 |
| 8,448,161 B2 * | 5/2013 | Goldman | 717/170 |
| 2002/0100036 A1 * | 7/2002 | Moshir et al. | 717/173 |
| 2003/0101245 A1 * | 5/2003 | Srinivasan et al. | 709/221 |
| 2004/0093593 A1 * | 5/2004 | Jhanwar et al. | 717/169 |
| 2005/0044541 A1 * | 2/2005 | Parthasarathy et al. | 717/173 |
| 2006/0095903 A1 | 5/2006 | Cheam et al. | |
| 2006/0230397 A1 * | 10/2006 | Cook et al. | 717/174 |
| 2007/0005661 A1 * | 1/2007 | Yang | 707/200 |

(Continued)

OTHER PUBLICATIONS

Matthew Bellew et al. "Update Propagation in Distributed Memory Hierarchy", [Online], IEEE Jun. 1990, pp. 521-528, [Retrieved from Internet on Feb. 18, 2014], <http://ieeexplore.ieee.org/stamp/stamp.jsp?tp=&arnumber=113506>.*

(Continued)

*Primary Examiner* — Thuy Dao
*Assistant Examiner* — Ziaul A Chowdhury
(74) *Attorney, Agent, or Firm* — DeLizio Gilliam, PLLC (57) ABSTRACT

An upgrade of an application product is installed to a first location in a shared environment that is different than a second location in the shared environment. An indication of the newer version of the application product and an indication of the first location are recorded in a registry that comprises indications of a plurality of application products and locations corresponding thereto. Metadata and binding information are obtained from an instance of the previous version of the application product while the instance of the previous version of the application product continues running. The metadata and the binding information are instantiated for an instance of the newer version of the application product in execution space thereof. Work is diverted work from the instance of the previous version of the application product to the instance of the newer version of the application product while both instances continue running in the shared environment.

19 Claims, 4 Drawing Sheets

(56) References Cited

U.S. PATENT DOCUMENTS

| | | | |
|---|---|---|---|
| 2007/0106701 A1* | 5/2007 | Periyasamy | 707/200 |
| 2008/0301676 A1* | 12/2008 | Alpern et al. | 718/1 |
| 2010/0058318 A1 | 3/2010 | Bernabeu-Auban et al. | |
| 2010/0162226 A1 | 6/2010 | Borissov et al. | |
| 2010/0218176 A1* | 8/2010 | Spanner et al. | 717/170 |
| 2010/0257517 A1 | 10/2010 | Sriram et al. | |
| 2010/0293201 A1* | 11/2010 | Thergaonkar et al. | 707/803 |
| 2012/0089711 A1* | 4/2012 | Zager et al. | 709/221 |

OTHER PUBLICATIONS

Wolfgang Emmerich et al., "Grid Service Orchestration using the Business Process Execution Language (BPEL)", [Online], Jun. 2005, pp. 1-24, [Retrieved from Internet on Feb. 18, 2014], <http://eprints.ucl.ac.uk/692/1/9.2bpel-tr.pdf>.*

Scott M. Lewandowski "Frameworks for Component-Based Client/Server Computing", [Online], ACM 1998, pp. 1-25, [Retrieved from Internet on Feb. 19, 2014], <http://courses.cs.vt.edu/~cs5204/fal105-kafura/Papers/Corba/Client-Server-Survey.pdf>.*

Antonio Carzaniga et al. "A Characterization Framework for Software Deployment Technologies", [Online], 1998, pp. 1-24, [Retrived from Internet on Feb. 19, 2014], <http://www.dtic.mil/get-tr-doc/pdf?AD=ADA452086>.*

Guiffrida, Cristiano et al., "Cooperative Update: A New Model for Dependable Live Update", 2009 , 6 pages.

* cited by examiner

SMART REBINDING FOR LIVE PRODUCT INSTALL

BACKGROUND

Embodiments of the inventive subject matter generally relate to the field of computer processing and, more particularly, to live install of a product with smart rebinding.

Typically, an enterprise customer runs multiple software products as a solution. The multiple software products interact to provide the solution for that enterprise customer. One software product implements a user interface, while another software products manages a database. Other software products implement web services, security, and data processing. These products are often updated on different timelines. For instance, the database manager product is updated at a time when the other software products are not updated. Upgrading one of these products is inefficient and often introduces an interruption in handling requests submitted to the software product being upgraded.

SUMMARY

Embodiments include a method for live install of a product without interrupting a running solution that includes an instance of the product. One or more files of a newer version of an application product are installed to a first location in a shared environment that is different than a second location in the shared environment where one or more files of a previous version of the application product are installed. The application product is one of a plurality of application products of a solution implemented in the shared environment. An indication of the newer version of the application product and an indication of the first location are recorded in a registry that comprises indications of the plurality of application products and locations corresponding thereto. Metadata and binding information are obtained from an instance of the previous version of the application product while the instance of the previous version of the application product continues running in the shared environment. The metadata and the binding information are instantiated for an instance of the newer version of the application product in execution space thereof. Work is diverted from the instance of the previous version of the application product to the instance of the newer version of the application product while both instances continue running in the shared environment.

Embodiments include a computer program product for installing a newer version of an application server product that is part of a solution without interrupting the solution. The computer program product comprises a computer readable storage medium having computer usable program code embodied therewith. The computer usable program code comprises a computer usable program code configured to install one or more files of a newer version of an application server product to a first location in a shared environment that is different than a second location in the shared environment where one or more files of a previous version of the application server product are installed. The application server product is one of a plurality of application products of a solution implemented in the shared environment. The computer usable program code is configured to record an indication of the newer version of the application server product and an indication of the first location in a registry that comprises indications of the plurality of application products and locations corresponding thereto. The computer usable program code is configured to obtain metadata and binding information from an instance of the previous version of the application server product while the instance of the previous version of the application server product continues running in the shared environment. The computer usable program code is configured to instantiate the metadata and the binding information for an instance of the newer version of the application server product in execution space thereof. The computer usable program code is configured to migrate an instance of a first of the plurality of application products from the instance of the previous version of the application server product to the instance of the newer version of the application server product.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The description uses the terms "instance," "component," "execution space," "wire," and "shared environment." The term "instance" is used to refer to executing code or program instructions. An application server instance refers to the executing code that implements the application server. The term "component" is used to refer to a reusable piece of code that implements well-defined interfaces. Typically, a runtime environment contains a component. For instance, a Java® Enterprise Edition (Java EE) runtime environment (also referred to herein as "container") contains JavaBean® components. Examples of components also include portlets and widgets. The term "execution space" refers to the memory allocated to an instance. Execution space may also encompass other resources (e.g., sockets). The term "wire" is used to refer to a logical connection between components/applications, including user interfaces, that facilitates the transfer of data between the components. A wire identifies a target component and the protocol for conducting data transfer (e.g., a defined interface). The term "shared environment" is used to refer to an environment shared by multiple users. Examples of a shared environment include a server, a virtual server, and an operating system.

A shared environment hosts an application server, a web server, a database connector and database, services, and software components (e.g., Java beans). Software products are installed on an instance of the application server. Instances of the software products bind to the application server, services, and components. When one of the software products are to be upgraded to a newer version, the newer version of the software product is installed and begins running on an application server instance, perhaps an instance of a newer version of the application server. The instance of the newer version of the software product (hereinafter referred to as "upgrade instance") obtains binding information for the instance of the previous version of the software product (hereinafter referred to as "current instance"). The upgrade instance binds to the service and objects in accordance with the obtained binding information. Requests that are in-process with the current instance are completed. Requests that are queued for the current instance are directed to the upgrade instance. The software product is upgraded while the solution continues to run, thus avoiding interrupting users using the solution.

Figure 1:
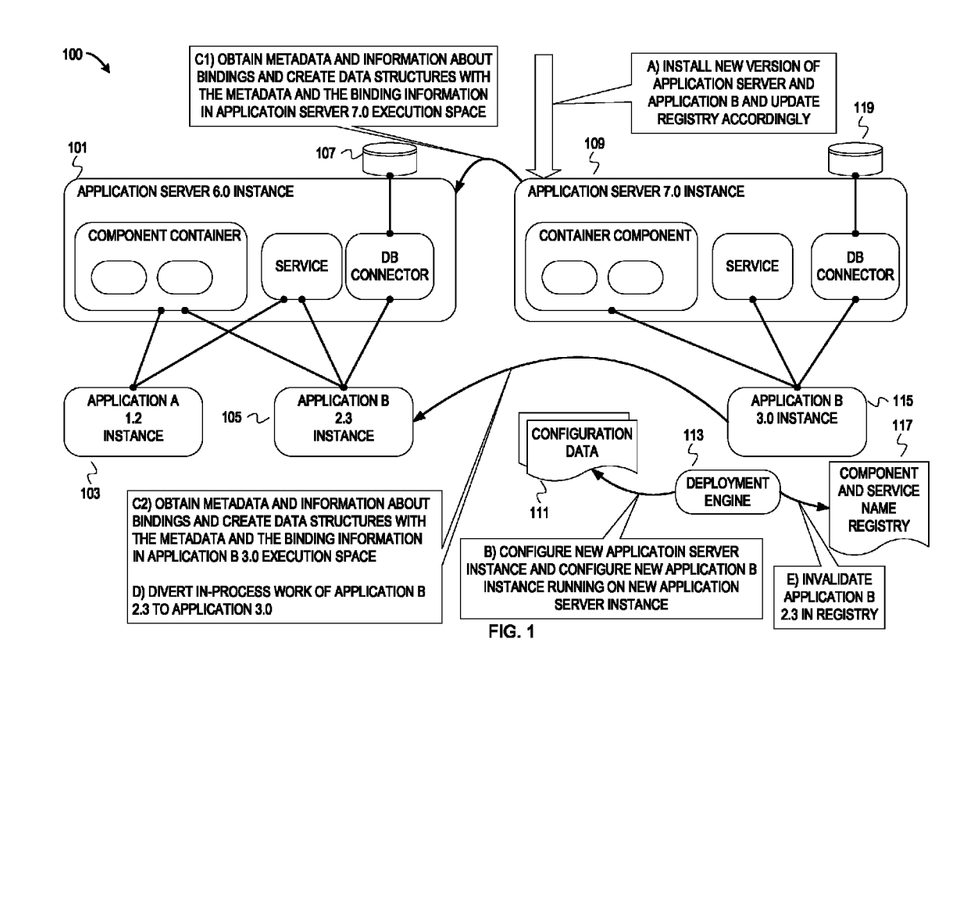
FIG. 1 depicts a conceptual diagram of an example live install with smart rebinding.

FIG. 1 depicts a conceptual diagram of an example live install with smart rebinding. A shared environment 100 initially hosts an application server version 6.0 instance 101, and application A version 1.2 instance 103, and an application B version 2.3 instance 105. The application server 6.0 instance 101 hosts a component container, a service, and a database connector. The component container is depicted as containing two software components. The database connector is depicted as managing a database 107 outside of the application server 6.0 instance 101. The shared environment 100 also hosts a deployment engine 113. The deployment engine 113 tracks the member of a solution by product identifier (e.g., product name and version) and an indication of location of the product (e.g., directory path).

The applications are bound to the application server 6.0 instance 101. The application A 1.2 instance 103 is bound to the component container, and the service of the application server 6.0 instance 101. The application B 2.3 instance is bound to the component container, the service, and the database container of the application server 6.0 instance 101.

At a stage A, a new version of the application server and application B are installed. A version 7.0 of the application server is installed in the shared environment 100. A version 3.0 of application B is also installed in the shared environment 100. The initial part of the install involves installing the application server and the application B into a specified location (e.g., folder or directory). After the location is known, the deployment engine 113 updates a component and service registry 117 with indications of the newly installed products and their locations. The deployment engine 117 adds an entry for the application server 7.0 and an entry the application B 3.0 in the component and service name registry 117.

At a stage B, the deployment engine 113 configures the newly installed products in accordance with configuration data in. The deployment engine 113 copies the configuration data of the application server 6.0 for the application server 7.0. The deployment engine 113 then modifies the configuration data for the application 7.0 to reflect any changes specified for application 7.0 (e.g., by an administrator or in a default configuration data). The configuration data for the newly installed products can indicate the solution host, port numbers, etc. Similarly, the deployment engine 113 copies configuration data of application B 2.3 for the application B 3.0. The deployment engine 113 modifies the copied configuration data to suit the application B 3.0. Although the example depicts the deployment engine 113 as configuring the newly installed software products, the illustration is intended to present an example to aid in understanding the inventive subject matter and not intended to limit embodiments. An implementation can task an administrative console or module with configuring newly installed software products.

At stage C1, the application server 7.0 has been launched. The resulting application server 7.0 instance 109 obtains metadata (e.g., metadata about pages, wires, and certificates, etc.) and binding information from the application server 6.0 instance 101. The application server 7.0 instance 109 creates data structures with the metadata and the binding information in execution space of the application server 7.0 instance 109. The application server 6.0 instance can be bound to data sources, shared libraries, etc. The application server 7.0 instance will also be bound to those data sources and shared libraries. The application server 7.0 instance 109 will be instantiated with services and components in accordance with its installation files and the configuration data in. The obtained metadata may be used to further configure the application server 7.0 instance 109. The application server 7.0 instance 109 will use the obtained metadata and binding information to bind to and/or establish additional components and/or services that may not be indicated in the installation files of the application server 7.0 installation files/script. FIG. 1 depicts the application server 7.0 instance 109 as hosting the container component, service, and database connector as depicted for the application server 6.0 instance. A newer version of an application server will not necessarily be instantiated with the same components or services as a previous version of the application server. FIG. 1 also depicts the database connector hosted by the application server 7.0 instance 109 as connecting to a database 119. The database instance 119 is most likely another instance of the database 107. If a database is involved in a software product installation, an implementation of smart rebinding install can either connect to a same database, in this example to database 107, or create another copy of the database 107. In some cases, all applications running on an instance of a previous version of an application server will migrate to the instance of the newer version of the application server. For those cases, the upgrade instance can use the artifacts (i.e., databases, components, services, etc.) of the previous version instance without creating replicas or redundancies. After stage C1 completes, the application server 7.0 instance 109 is running and can accept requests/tasks.

At stage C2, At stage C1, the application B 3.0 instance 115 has been launched. The resulting application B 3.0 instance 115 obtains metadata and binding information from the B 2.3 instance 105. The B 3.0 instance 115 creates data structures with the metadata and the binding information in execution space of the B 3.0 instance 115. With the binding information, the application B 3.0 instance 115 discovers that it should bind to the container component, service, and database connector that is now hosted in the application server 7.0 instance. The application B 3.0 instance 115 binds to those hosted in the application server 7.0 instance instead of the application server 6.0 instance because the application B 3.0 instance 115 has been configured to run on the application server 7.0 instance 109, and is unaware of the application server 6.0 instance. After stage C2 completes, the application B 3.0 instance 115 is running and can accept requests/tasks. The application B 3.0 instance 115 notifies the application B 2.3 instance that the upgrade version is able to accept work/task requests.

At a stage D, the application B 2.3 instance 105 diverts in-process work to application B 3.0 instance 115. Once it is determined that the upgrade instance of application B 3.0 can accept requests, the application B 2.3 instance 105 begins to queue received requests, and transfers the ownership of the queue or the queue itself to the application B 3.0 instance 115. If processing a request involves multiple operations, some of which are independent on other operations, embodiments can allow a current instance to complete operations that have dependencies and pass the independent operations to the upgrade instance.

Although this example does not depict bindings between the instances of application A and application B, applications can be bound to each other or have dependencies between each other. For example, a user interface may present content from application A in a first panel and content from application B in a second panel. The content from application A may be dependent upon the content from application B. When the newer version of product B is installed, the binding information and metadata is updated to preserve the relationship between the instance of application A and the instance of the newer version of application B.

At stage E, the deployment engine 119 invalidates the in the component and service name registry 117 for the application B 2.3 instance 105. The entry is marked for deletion after the shared environment 100 is stabilized. The shared environment 100 reaches stabilization, with respect to application B, when the following occurs: 1) application B 2.3 instance 103 no longer handles any requests; 2) references to application B 2.3 have been cleared (e.g., an application that is not running has a reference to application 2.3); and 3) any bindings to the application B 2.3 instance 105 have been transferred to the application B 3.0 instance 115 (e.g., another application or service may be bound to the application B 2.3 instance 105).

Although the example depicts implementing the smart rebinding functionality (i.e., live transfer of metadata and binding information between versions of a software product) in the software products, embodiments are not so limited. Other embodiments implement smart rebinding in a centralized fashion. A separate executing piece of code (e.g., the deployment engine) tracks metadata and the binding information for each software product installed on a shared environment. Tracking can involve recording pointers to the metadata and the binding information, maintaining a copy of the location of the metadata and binding information, etc. This piece of code ("smart rebinding manager") monitors the installation process, and communicates the metadata and binding information to a newly installed software product once it detects launch of the newly installed product. The smart rebinding manager can handles diversion of requests from a previous instance to an upgrade instance.

Figure 2:
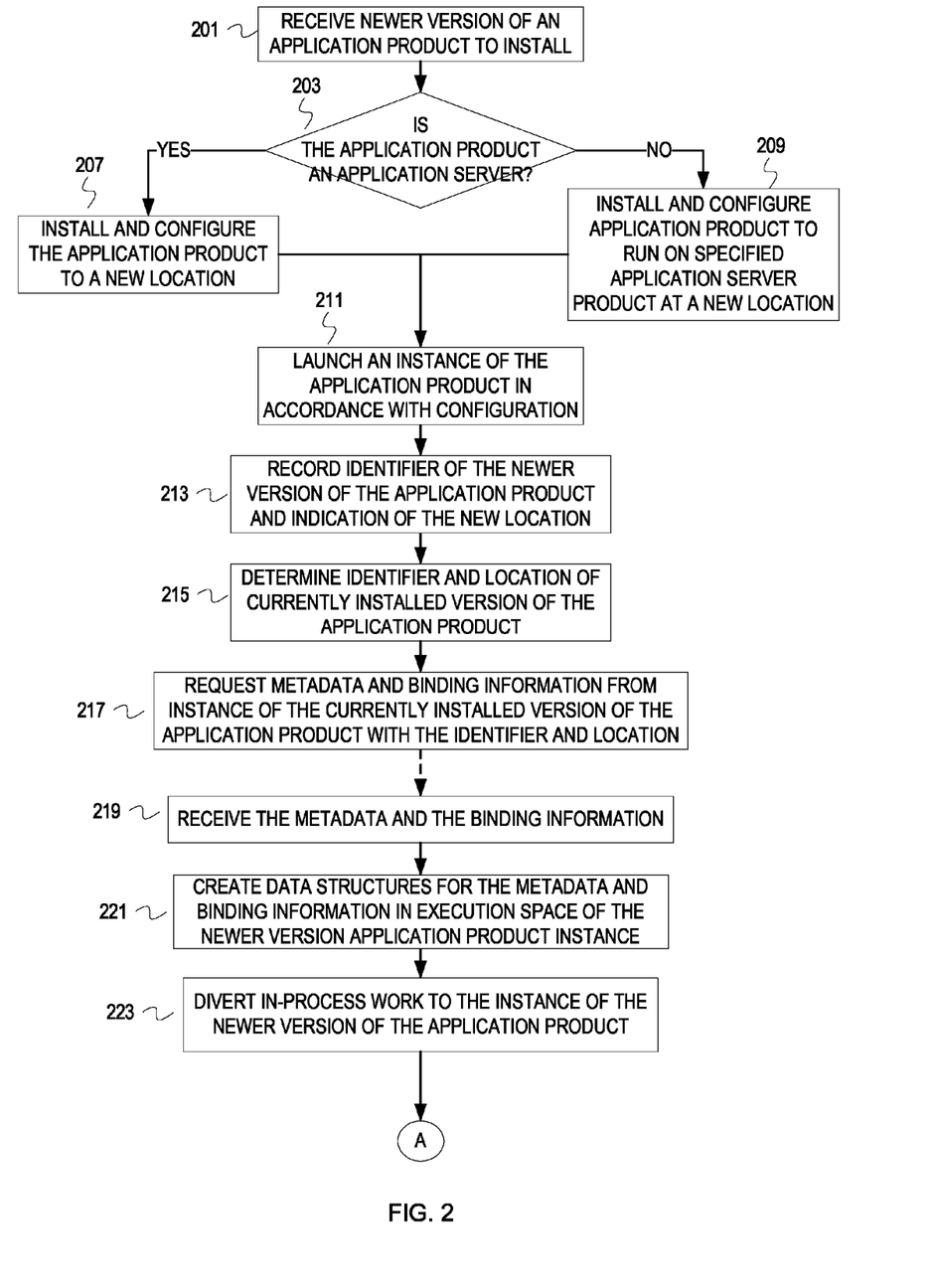
FIGS. 2-3 depict a flowchart of example operations for installing an application upgrade with smart rebinding.
Figure 3:
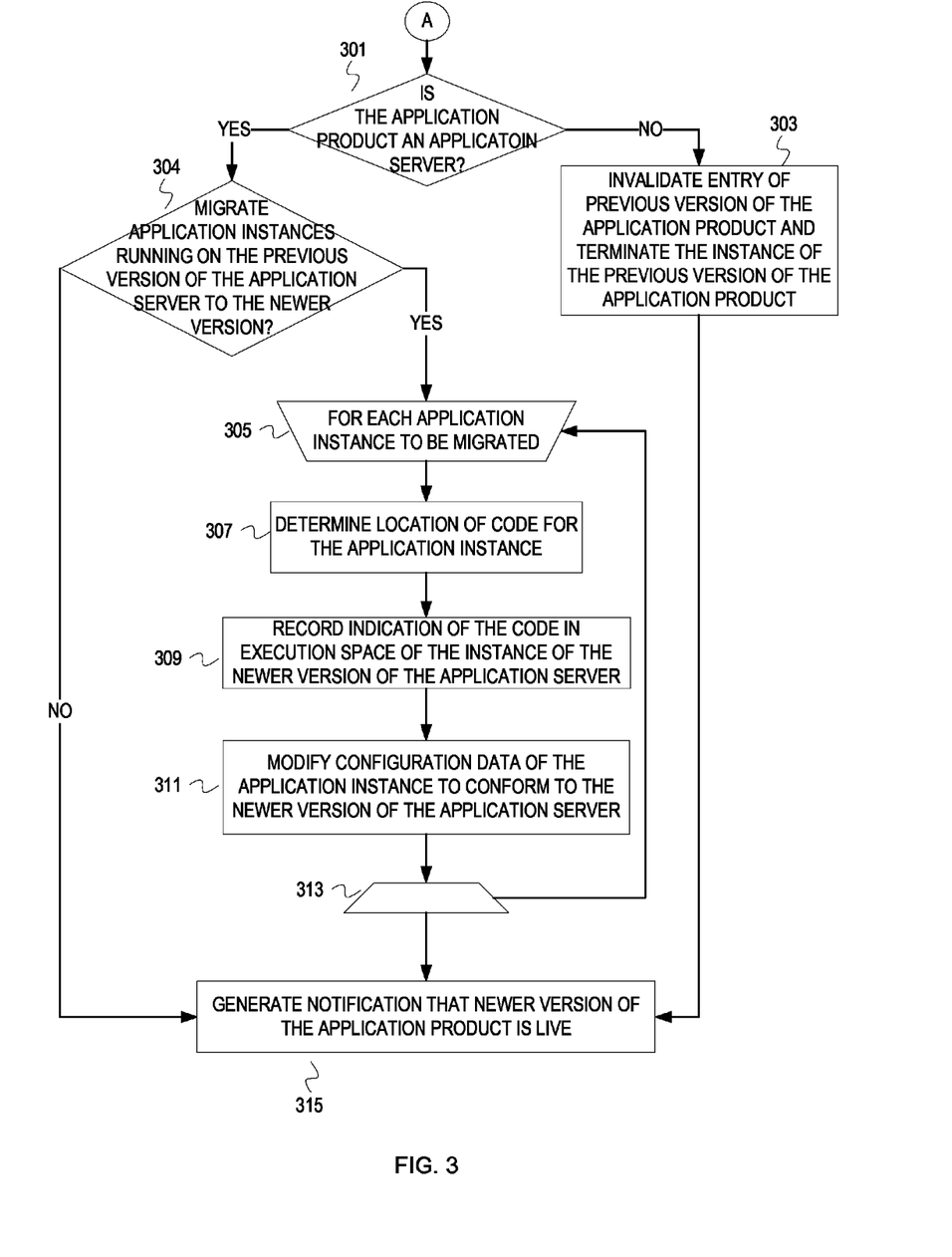

FIGS. 2-3 depict a flowchart of example operations for installing an application upgrade with smart rebinding. At block 201, a newer version of an application product is received to install. At block 203, it is determined if the application product is an application server. For example, a deployment engine administrative module examines the product name or identifier. If the product is an application server, then control flows to block 207. If the product is not an application server, then control flows to block 209.

At block 207, the application server product is installed to a new location and configured. For example, the application server product is installed into a new folder or directory. Implementations do not necessarily install the application server product to a newly created location. The "new" location is just different than the location of the currently installed version of the application server product. Control flows from block 207 to block 211.

At block 209, the application product is installed at a new location and configured to run on a specified application server. The application product may be installed along with an application server product. In that case, the application server product is installed first. After the application server product is up and running, the application product is installed to run on the newly installed application server product. Control flows from block 209 to block 211.

At block 211, an instance of the application is launched in accordance with the configuration. Any one or more of a user, default configuration, and previous version configuration data can be used to configure the application product.

At block 213, an identifier of the newer version of the application product and an indication of the new location are recorded. For example, a deployment engine records a name and version of the application product along with the location of the application product in a data structure that tracks installed products.

At block 215, an identifier and location of the currently installed version of the application product are determined. For example, the deployment engine looks up an entry with a similar name or identifier as the identifier of the product being installed.

At block 217, metadata and binding information is requested from the instance of the currently installed version of the application product. For example, smart rebinding code of the upgrade instance calls a function/method using the location information looked up in a name service registry. The function can be defined with an application programming interface.

At block 219, the metadata and the binding information are received.

At block 221, data structures for the metadata and the binding information are created in the execution space of the upgrade instance. The data structures correspond to any one of a web page, a portlet, wires, preferences, etc. For example, data structures are instantiated for the wires that connect the current instance with other components in the shared environment. Those data structures are modified to indicate the upgrade instance instead of the current instance. If the current instance is a target of a wire, then a data structure will be instantiated to indicate the upgrade instance as the target of the wire. For a wire that indicates the current instance as a source, a data structure will be instantiated that indicates the upgrade instance as the source. Embodiments can copy the data structures that represent the wires, and modify the copied data structures for the upgrade instance. When the upgrade instance takes over for the current instance, the copied wires are activated. Other embodiments modify the data structures that represent the wires with invalid entries that indicate the upgrade instance. When the upgrade instance takes over, the entries for the upgrade instance are activated and the entries for the current instance are marked as invalid to eventually be removed from the wire data structures. To illustrate, an application A comprises a user interface that is wired to an application B. For this illustration, the application B operates as a source and the application B operates as a target of the wire. When application A is upgraded, the wire is modified (or a new wire is created) to logically connect the upgrade version of application A with the application B in accordance with the existing wire configuration of application B as a source and application A as a target. Content from the upgrade instance of application A and the application B are presented via the wire in the user interface of the upgrade instance of application A.

At block 223, in-process work is diverted to the upgrade instance from the current instance. For example, a smart rebinding manager intercepts requests submitted to the current instance and passes those requests to the upgrade instance, while informing the requestor of the upgrade instance. For example, the wires for the upgrade instances are now used instead of the wires connected to the current instance, thus maintaining integration between the product being upgraded and other products.

FIG. 3 depicts example operations that continue from block 223 of FIG. 2. At block 301, it is determined if the application product is an application server. Embodiments are not limited to making multiple determinations about the product being installed. An embodiment can follow different paths of operations after making an initial determination as to the type of product being installed. If the application product is an application server, then control flows to block 304. If the application product is not an application server, then control flows to block 303.

At block 303, the entry for previous version of the application product is invalidated and marked for removal. The current instance is then terminated. Termination is delayed to allow for the environment to stabilize as described earlier. An application server product is not invalidated in this example because other application instances may be running on a current instance of an application server. An administrator can manually remove an entry for a server type of application when the administrator considers it safe. Control flows from block 303 to block 315.

At block 304, it is determined if application instances running on the current instance of the application server will migrate to the upgrade instance. For example, a smart rebinding manager examines configuration data, an administrator setting, etc. to determine whether application instances will migrate. If one or more application instances will migrate, then control flows to block 305. If none of the application instances running on the current instance of the application server will migrate, then control flows to block 315.

At block 305, a set of operations begin for each of the applications instances to be migrated.

At block 307, a location of code (e.g., binary) for the application instance is determined. For example, the deployment engine looks up location of binary for an application in a registry with an identifier corresponding to the application instance.

At block 309, an indication of the location of the code is recorded in the execution space of the upgrade instance. For example, a deployment engine communicates, to the upgrade instance, a reference to binary of the migrating application. The upgrade instance then creates a data structure for the application instance.

At block 311, configuration data of the application instance is modified to conform to the upgrade instance of the application server. For example, upgrade instance of the application server or an administrative module updates the configuration data to reflect that the application instance will be running on the upgrade instance of the application server.

At block 313, it is determined whether there is another application instance to process. If not, then control flows to block 315. If so, then control returns to block 305.

At block 315, a notification is generated that the upgrade instance is live. For example, the deployment engine writes to a log that the live install has completed.

The flowcharts depicted in the figures are intended to aid in understanding the inventive subject matter, and should not be used to limit embodiments of the inventive subject matter. Embodiments can perform additional operations, fewer operations, operations in parallel, in a different order, etc. For instance, an embodiment can perform configuration operations after launching an application product in contrast to the depicted operations at block 207 and 209 of FIG. 2. An embodiment can extract the operations for migrating application instances as depicted in FIG. 3 and perform the migration operations separately from the smart rebinding installation.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
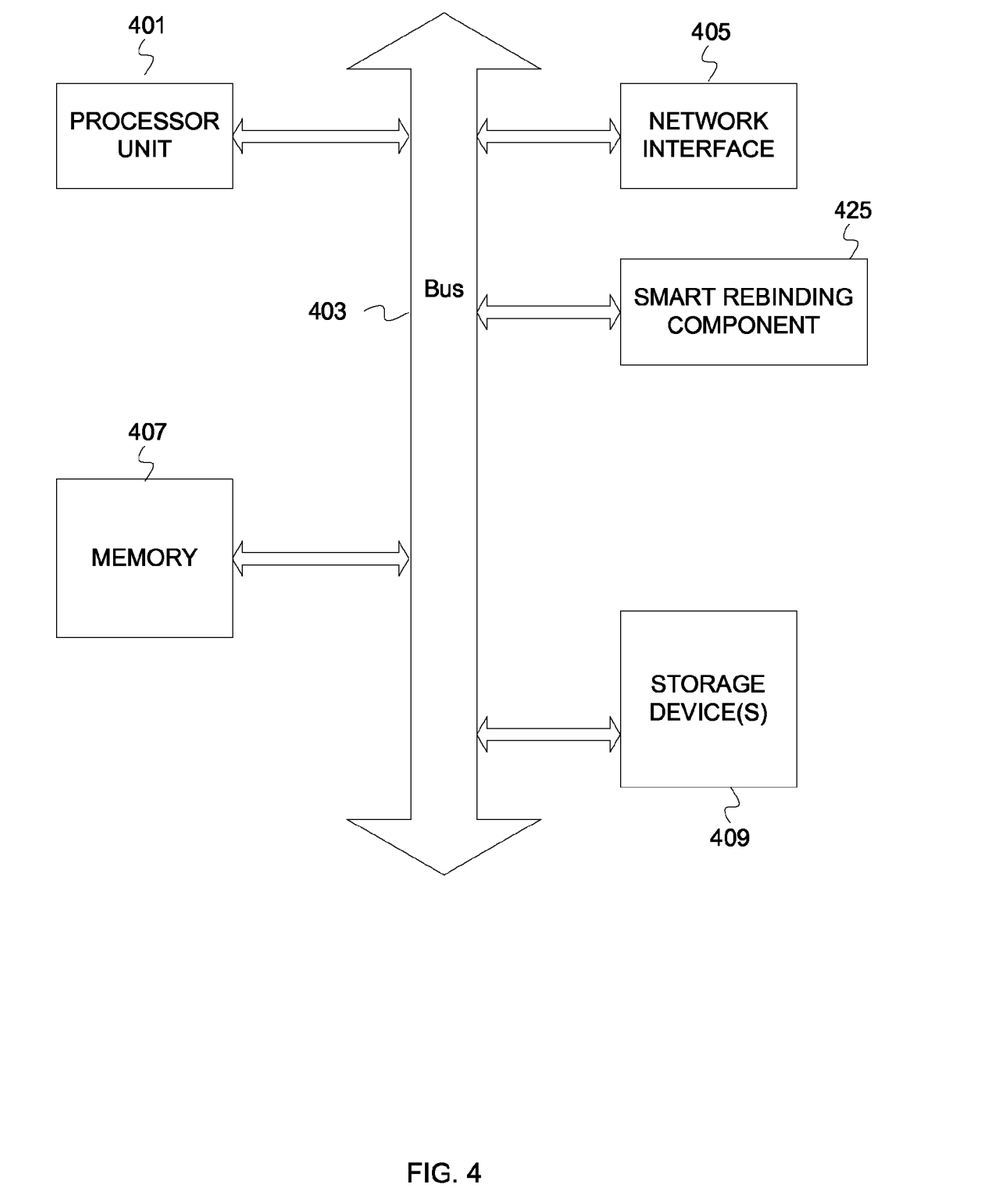
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system also includes a smart rebinding component 425, depicted as coupled with the bus 403. The smart rebinding component 425 installs a software product that is part of a multi-product solution without interrupting the solution. Bindings of a previous version of the software product already installed are obtained and utilized for the newer version of the software product being installed. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for live install of a part of a solution with smart binding as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
    installing one or more files of a newer version of an application product to a first location in a shared environment that is different than a second location in the shared environment where one or more files of a previous version of the application product are installed, wherein the application product is one of a plurality of application products of a solution implemented in the shared environment;
    recording an indication of the newer version of the application product and an indication of the first location in a registry that comprises indications of the plurality of application products and locations corresponding thereto;
    obtaining metadata and binding information from an instance of the previous version of the application product while the instance of the previous version of the application product continues running in the shared environment;
    instantiating the metadata and the binding information for an instance of the newer version of the application product in execution space thereof;
    configuring the newer version of the application product using configuration data of the previous version of the application product; and
    diverting work from the instance of the previous version of the application product to the instance of the newer version of the application product while both instances continue running in the shared environment.

2. The computer-implemented method of claim 1, wherein obtaining the metadata and the binding information from the instance of the previous version of the application product comprises:
    the instance of the newer version of the application product requesting the metadata and the binding information from the instance of the previous version of the application product, wherein the binding information comprises reference information to at least one of a software component, service, and instance of another one of the plurality of application products; and
    the instance of the previous version of the application product indicating the metadata and the binding information to the instance of the newer version of the application product.

3. The computer-implemented method of claim 1, wherein obtaining the metadata and the binding information from the instance of the previous version of the application product comprises:
    an instance of program instructions, which is executing in the shared environment and is distinct from the application product, looking up the metadata and the binding information in a structure comprising information for instances of the plurality of application products running in the shared environment; and communicating the metadata and the binding information to the instance of the newer version of the application product.

4. The computer-implemented method of claim 1, wherein said diverting the work from the instance of the previous version of the application product to the instance of the newer version of the application product while both instances continue running in the shared environment comprises:

the instance of the previous version of the application product enqueueing requests received subsequent to the instance of the newer version of the application product starting in the shared environment; and transferring the enqueued requests to the instance of the newer version of the application product.

5. The computer-implemented method of claim 1 further comprising:

invalidating an entry in the registry for the previous version of the application product; and marking the entry for deletion.

6. The computer-implemented method of claim 5 further comprising deleting the entry for the previous version of the application product after the shared environment stabilizes with respect to the instance of the newer version of the application product.

7. A computer program product for installing a newer version of an application server product that is part of a solution without interrupting the solution, the computer program product comprising:

a non-transitory computer readable storage medium having computer usable program code embodied therewith, the computer usable program code comprising a computer usable program code configured to:

install one or more files of a newer version of an application server product to a first location in a shared environment that is different than a second location in the shared environment where one or more files of a previous version of the application server product are installed, wherein the application server product is one of a plurality of application products of a solution implemented in the shared environment;

record an indication of the newer version of the application server product and an indication of the first location in a registry that comprises indications of the plurality of application products and locations corresponding thereto;

obtain metadata and binding information from an instance of the previous version of the application server product while the instance of the previous version of the application server product continues running in the shared environment;

instantiate the metadata and the binding information for an instance of the newer version of the application server product in execution space thereof;

configure the newer version of the application server product using configuration data of the previous version of the application server product; and migrate an instance of a first of the plurality of application products from the instance of the previous version of the application server product to the instance of the newer version of the application server product.

8. The computer program product of claim 7, wherein the computer usable program code configured to migrate the instance of the first of the plurality of application products from the instance of the previous version of the application server product to the instance of the newer version of the application server product comprises the computer usable program code being configured to:

determine a location in the shared environment of the first of the plurality of application products;

record an indication of the location of the first of the plurality of application products in the execution space of the instance of the newer version of the application server product; and modify configuration data for the first of the plurality of application products in accordance with running the first of the plurality of application products on the newer version of the application server product instead of the previous version of the application server product.

9. A computer program product for installing a newer version of an application product that is part of a solution without interrupting the solution, the computer program product comprising:

a non-transitory computer readable storage medium having computer usable program code embodied therewith, the computer usable program code comprising a computer usable program code configured to:

install one or more files of a newer version of an application product to a first location in a shared environment that is different than a second location in the shared environment where one or more files of a previous version of the application product are installed, wherein the application product is one of a plurality of application products of a solution implemented in the shared environment;

record an indication of the newer version of the application product and an indication of the first location in a registry that comprises indications of the plurality of application products and locations corresponding thereto;

obtain metadata and binding information from an instance of the previous version of the application product while the instance of the previous version of the application product continues running in the shared environment;

instantiate the metadata and the binding information for an instance of the newer version of the application product in execution space thereof;

configure the newer version of the application product using configuration data of the previous version of the application product; and divert work from the instance of the previous version of the application product to the instance of the newer version of the application product while both instances continue running in the shared environment.

10. The computer program product of claim 9, wherein the computer usable program code configured to obtain the metadata and the binding information from the instance of the previous version of the application product comprises the computer usable program code configured to:

request the metadata and the binding information from the instance of the previous version of the application product, wherein the binding information comprises reference information to at least one of a software component, service, and instance of another one of the plurality of application products.

11. The computer program product of claim 9, wherein the computer usable program code configured to divert the work from the instance of the previous version of the application product to the instance of the newer version of the application product while both instances continue running in the shared environment comprises the computer usable program code configured to:

enqueue requests received subsequent to the instance of the newer version of the application product starting in the shared environment; and transfer the enqueued requests to the instance of the newer version of the application product.

12. The computer program product of claim 9, wherein the computer usable program code is further configured to:

invalidate an entry in the registry for the previous version of the application product; and mark the entry for deletion.

13. The computer program product of claim 9, wherein the computer usable program code is further configured to delete the entry for the previous version of the application product after the shared environment stabilizes with respect to the instance of the newer version of the application product.

14. An apparatus comprising:

a processor;

a computer readable storage medium having computer usable program code embodied therewith, the computer usable program code executable by the processor to cause the apparatus to, install one or more files of a newer version of an application product to a first location in a shared environment that is different than a second location in the shared environment where one or more files of a previous version of the application product are installed, wherein the application product is one of a plurality of application products of a solution implemented in the shared environment;

record an indication of the newer version of the application product and an indication of the first location in a registry that comprises indications of the plurality of application products and locations corresponding thereto;

obtain metadata and binding information from an instance of the previous version of the application product while the instance of the previous version of the application product continues running in the shared environment;

instantiate the metadata and the binding information for an instance of the newer version of the application product in execution space thereof;

configure the newer version of the application product using configuration data of the previous version of the application product; and divert work from the instance of the previous version of the application product to the instance of the newer version of the application product while both instances continue running in the shared environment.

15. The apparatus of claim 14, wherein the computer usable program code being executable by the processor to cause the apparatus to obtain the metadata and the binding information from the instance of the previous version of the application product comprises computer usable program code executable by the processor to cause the apparatus to:

request the metadata and the binding information from the instance of the previous version of the application product, wherein the binding information comprises reference information to at least one of a software component, service, and instance of another one of the plurality of application products.

16. The apparatus of claim 14, wherein the computer usable program code being executable by the processor to cause the apparatus to divert the work from the instance of the previous version of the application product to the instance of the newer version of the application product while both instances continue running in the shared environment comprises computer usable program code executable by the processor to cause the apparatus to:

enqueue requests received subsequent to the instance of the newer version of the application product starting in the shared environment; and transfer the enqueued requests to the instance of the newer version of the application product.

17. The apparatus of claim 14, wherein the computer usable program code is further executable by the processor to cause the apparatus to:

invalidate an entry in the registry for the previous version of the application product; and mark the entry for deletion.

18. The apparatus of claim 17, wherein the computer usable program code is further executable by the processor to cause the apparatus to delete the entry for the previous version of the application product after the shared environment stabilizes with respect to the instance of the newer version of the application product.

19. The apparatus of claim 14, wherein the computer usable program code being executable by the processor to cause the apparatus to obtain metadata and the binding information from the instance of the previous version of the application product comprises computer usable program code executable by the processor to cause the apparatus to:

obtain information about a wire that connects the instance of the previous version of the application product with an instance of a software component instantiated in the shared environment, wherein the wire represents a logical connection that facilitates data transfer between the instance of the previous version of the application product and the software component instance;

wherein the computer usable program code being executable by the processor to cause the apparatus to instantiate the metadata and the binding information for the instance of the newer version of the application product in execution space thereof comprises computer usable program code executable by the processor to cause the apparatus to instantiate one or more data structures for the wire to connect the instance of the newer version of the application product and the software component instance, wherein the wire connects at least one of a user interface of the application product and a user interface of the software component.

* * * * *